(12) United States Patent
Gurevich et al.

(10) Patent No.: US 6,980,379 B1
(45) Date of Patent: Dec. 27, 2005

(54) FLAT WIDE-ANGLE OBJECTIVE

(75) Inventors: Igor Gurevich, Saarbrucken (DE); Victor Faybishenko, Union City, CA (US); Leonid Velikov, San Carlos, CA (US)

(73) Assignee: Microalign Technologies, Inc., San Carlos, CA (US)

( * ) Notice: Subject to any disclaimer, the term of this patent is extended or adjusted under 35 U.S.C. 154(b) by 0 days.

(21) Appl. No.: 10/893,860

(22) Filed: Jul. 19, 2004

Related U.S. Application Data

(63) Continuation-in-part of application No. 10/862,178, filed on Jun. 7, 2004.

(51) Int. Cl.[7] .......................... G02B 9/00; G02B 13/04; G02B 9/60
(52) U.S. Cl. ........................ 359/754; 359/753; 359/770
(58) Field of Search .................. 359/752–754,756, 359/762, 763, 770, 738, 621–622

(56) References Cited

U.S. PATENT DOCUMENTS

| 4,188,092 A | 2/1980 | Momiyama |
| 5,790,324 A | 8/1998 | Park |
| 6,084,719 A | 7/2000 | Saguwara et al. |
| 6,545,824 B2 | 4/2003 | Sensui |
| 6,721,101 B2 | 4/2004 | Daniell |

OTHER PUBLICATIONS

U.S. Appl. No. 10/862,178, filed Jun. 7, 2004, Igor Gurevich et al.

*Primary Examiner*—Georgia Epps
*Assistant Examiner*—Alicia M. Harrington

(57) ABSTRACT

A flat wide-angle objective of the invention consists of a first sub-unit that is located on the object side of the objective and includes an assembly of two conventional aspheric negative, plano-concave lenses, and a second sub-unit in the form of a set of four microlens arrays arranged on the image-receiving side of the objective. The microlenses of all microlens arrays have the same arrangement of microlenses in all the arrays. A diaphragm array with restricting openings can be sandwiched between a pair of the microlens arrays. The invention makes it possible to reduce longitudinal dimension of the objective. In operation, the first sub-unit creates an imaginary image of the object in its focal plane, which is located on object side of the objective, while the second sub-unit creates an actual image of the object in the image plane on the image-receiving side of the objective.

20 Claims, 8 Drawing Sheets

FLAT WIDE-ANGLE OBJECTIVE

CROSS-REFERENCE TO RELATED APPLICATIONS

The present patent application is a continuation in part of U.S. patent application Ser. No. 10/862,178 filed by the same applicants on Jun. 7, 2004 and entitled "Flat Wide-Angle Lens System".

BACKGROUND OF THE INVENTION

1. Field of the Invention

The present invention relates to the field of optics and, more particularly, to a wide-angle flat photographic lens objective. More specifically, the invention relates to a wide-angle flat photographic lens system which is built on an entirely new principle of combining a group or groups of flat microlenses with a group or groups of conventional optical lenses. The lens system of the invention may find application in photographic cameras, image projection systems, etc.

2. Background of the Invention

For better understanding the terminology used in the present description and principles of structure of optical systems in general, it would be advantageous to make some short introduction into the field of optical objectives.

An objective is an optical system or a part thereof that faces an object of observation or photographing and that creates a real image of the object turned 180° with respect to the object. Depending on the types of optical elements, objectives can be divided into lens-types, mirror-types, mirror-lens-types, and kinoform-type objectives. Most popular are lens-type objectives that are capable of acquiring various characteristics due to increase in the number of component lenses.

Photographic objectives or similar objectives of motion-picture cameras, TV cameras, night-vision instruments, and objectives used in television generally create reduced images of remote objects on a layer of a photosensitive material or on photoreceivers, e.g., TV picture tubes, matrices or linear photoreceivers, or photocathodes of optoelectronic devices. The scale of an image is proportional to a focal distance f' of the objective, while illumination intensity is inversely proportional to a second power of a diaphragm number K, which is an f'/D ratio where D is a diaphragm of an inlet pupil of the objective. A value of 1/K is known as an aperture ratio. The limit value of the diaphragm number that allows correction of aberrations is K=0.5. A majority of existing objectives have K within the range of $3 > K \leq 1.2$. Photographic resolution capacity $N_f$ of photo and motion-picture objectives depends on aberrations, as well as on resolution capacity $N_c$ of the photosensitive layer of the reproducing medium and can be calculated with the use of the following approximated formula: $1/N_f = 1/N_0 + 1/N_c$, wherein $N_0$ is a visual resolution capacity of the objective. In a lens system, aberration is an error resulting from a failure of light rays from one point to converge to a single focus. A part of a space or surface the points of which are reproduced by the objective with a required quality is characterized by an angular field, i.e., a flat angle $2\omega$ that corresponds to a solid angle that is coaxial with the optical axis and has the apex in the center of the inlet pupil of the objective.

Angular field of modern photo cameras is normally within the range of 40° to 70°, while in aerophoto cameras this angle may reach 140°.

A special group is objectives, which are also known as zoom lenses, the focal distance of which can be smoothly adjusted in a wide range by displacing separate lenses or groups of lenses along their optical axis. The number of lenses in such objectives may be as high as 30 or more. Such objectives are used, e.g., in transmission TV cameras, video cameras, and photo cameras. A ratio between the maximal and minimal focus distances may reach 40, or more. For decrease of optical losses, modern objectives are provided with anti-reflective coatings.

Normally, conventional wide-angle photographic objectives or lens systems have big dimensions, i.e., a lengthy objective, and therefore are inconvenient for use and storage. Another characteristic feature of a wide-angle photographic lens system is an increased diameter. This not only increases the overall radius and hence the dimension of the lens system but also significantly increase the weight of the objective as a whole.

There exist a large number of wide-angle photographic lens systems of different types, e.g., conventional photographic lens systems for photo cameras, image projecting lens systems, wide-field lithography systems, etc.

For example, U.S. Pat. No. 4,188,092 issued in 1980 to Kikuo Momiyama describes a retrofocus type lens for a photo camera having an angle of view at least 75° and F number 1:2.0. The lens includes a first lens group of a divergent type, a second lens group of a convergent type, and a third lens group of a convergent type. The first lens group includes in the order stated a positive meniscus lens, a negative meniscus lens, a positive meniscus lens, and a negative meniscus lens. The second lens group includes a positive lens, which is either a single lens or consists of a positive lens, and a negative lens cemented to each other and with a front convex face directed toward an object to be photographed. The third lens group includes a positive lens having a rear convex face directed toward an image of the object, a biconcave lens with its front surface radius smaller than its rear surface radius, a positive meniscus lens with a convex surface facing the image, and a positive lens. The biconcave lens and the positive meniscus lens are respectively replaceable with cemented doublet lenses. The lens system is characterized in that the first lens group includes meniscus lenses arranged in the order of positive, negative, positive and negative lenses, and particularly in that the third positive meniscus lens serves effectively to correct chromatic distortion aberration and chromatic coma aberration.

Another example, e.g., U.S. Pat. No. 6,084,719 issued in 2000 to Saburo Saguwara, et al. discloses a projection optical system that includes a first lens unit in which negative lenses included therein are larger in number than positive lenses included therein, and a second lens unit in which positive lenses included therein are larger in number than negative lenses included therein. In this projection system, design parameters are determined such that an off-axial principal ray intersects an optical axis at a point between the first lens unit and the second lens unit, and telecentricity is made on the second conjugate point side. The second lens unit includes a negative lens of meniscus form convex toward the second conjugate point side and a positive lens whose both surfaces are convex.

A common problem associated with wide-angle lens systems of the types described above as well as with other conventional wide-angle lens systems is that an increase in the aperture ratio of the lens system, widening of the field of observation, and improvement in resolution capacity of the optical system require an increase in the lens diameter. However, such an increase leads to more noticeable aberrations, and in order to solve the aberration problem, it is necessary to introduce into the system new optical elements. However, Increasing the number of lens elements to overcome the above-described drawbacks degrades the performance of the lens system due to adverse effects such as flare. All this significantly increases the manufacturing cost and the cost of the products.

Attempts have been made to solve the above problems and to improve conventional wide-angle lens systems, e.g., by increasing the amount of optical elements.

For example, U.S. Pat. No. 5,790,324 issued in 1998 to Cheon-Ho Park describes a wide-angle photographic lens system in which improvement in optical characteristics is achieved at the expense of complexity, increased weight, and increased cost. More specifically, the aforementioned lens system consists of seven lens elements, including combined lens elements.

One of the latest patents in this field, i.e., U.S. Pat. No. 6,545,824 issued in 2003 to Sensui Takayuki, discloses a significantly improved lens optical system, in which the number of lens elements is reduced to five along with a twice shorter length of the system as a whole. Nevertheless, while preserving the traditional structure, the lens optical system of U.S. Pat. No. 6,545,82 still remains large in size, heavy in weight, and complicated in structure. These problems will always remain until a wide-angle lens system is designed on traditional principles of wide-lens system architecture.

A trend that appeared at the end of 90's put forward an entirely new concept for the design of objectives that, on one hand, could satisfy all the requirements of modern optical objectives of high-quality photo cameras and, on the other hand, could satisfy the requirements of miniaturization. For example, modern digital cameras of megapixel's resolution have dimensions from a matchbox to a cigarette pack. The size of the built-in objectives makes it possible to arrange the entire objective within the boundaries of the camera's casing. It is understood that objectives of traditional design, i.e., those that use conventional three-dimensional optical lenses, cannot be reduced to the dimensions of a digital-camera objective without the loss of quality. If one reviews the situation on the present market of megapixel cameras, it can be seen that in this technique the amount of pixels that can be used for obtaining an image is rapidly growing from month to month while matching of the growing megapixel capacity of the objective with the optical components without the loss of image quality becomes more and more problematic. In addition to photo cameras, the modules with integrating optics assembly with the chip and wire assembly find application in such products as cell phones, video phones, notebooks, computers, toys, games, biometrics, etc.

Amkor Technology Co., Inc., Pennsylvania, USA, has developed an Image Sensor Camera Module, which is a complete camera solution that integrates an image sensor chip with DSP (digital processors), optics, passive components, and flexible circuit. Using an advance manufacturing solution, Amkor enabled the integration of chip and wire assembly with the optics assembly. This resulted in a low cost solution for a complete camera in a very small form factor with the length of the objectives, including wide-angle objectives, of about 8 mm. However, such results were achieved due to the use of traditional optical lenses having a very complicated shape with variable-sign curvatures on the same surface of the lens. It is understood that manufacture of such lenses requires the use of complicated non-trivial technology. With further increase in the pixel capacities of the CCD's or CMOS's the aforementioned manufacturing solution may confront some limitations from the side of optical component quality, especially if one tries to make the optics flat.

On the other hand, development of optical fiber systems, light-emitting diodes and laser diodes, systems of management, control, and conversion of light beams in optical communication systems, etc. gave impetus to developing new and efficient microoptical systems such as microlenses, microobjectives, collimators, etc. In principle of their operation and structure, the aforementioned optical elements are the same as respective traditional optical lenses, objective, collimators, etc., but are intended for working with optical beams of small diameters, e.g., from several tens of microns to several millimeters. Miniaturization of optical elements to the level of current microlenses led to very stringent requirements with regard to manufacturing accuracy and narrowed the allowable tolerances, e.g., on optical surfaces, to nanometric level. Recent success in this technology made it possible to produce microoptical lenses with very accurate aspherical surfaces.

A series of inventions made by Stephen Daniell (see, e.g., U.S. Pat. No. 6,721,101 issued in 2004) relates to the use of a microlens optical system for obtaining a 3-D image in the observer's sight. This technique is based on the principle of creation of parallax between the "left" and "right" images, which is perceived by the observer as a stereo effect.

The arrays used in the above inventions can be divided into two categories. The arrays of the first type uses air as a low-index material. Such arrays may be used, for example, in illuminated displays of electronic image detection, machine vision, and real-time 3D video capture. Arrays of the second use a fluoropolymer as a low-index material, and convey a great preponderance all incident light to the image plane.

More specifically, the system of U.S. Pat. No. 6,721,101 (as well as the systems of all other inventions of Stephen Daniell) is an assembly of two microlens array substrates, which in an overlapped state possess better optical characteristics than a single microlens array substrate. From the optical point of view, this system functions as follows: an object located at a finite distance from the observer is converted by the overlapped arrays into an infinitely located image, which is observed with the maximum possible angle of observation. This allows the observer, who is located on the symmetry axis of a display, to clearly see on this display two independent images of one object with the left and the right eyes.

In reality, the Daniell's system does not widen the angle of observation for the observer but rather creates a virtual effect of stereovision. In this system, the second and third surfaces of the array work as a separator of angles of incidence of light, i.e., starting from angle that exceeds a predetermined value, the light does not pass through the system but is reflected on the principle of total inner reflection, e.g., to the right eye, while the light incident at smaller angles passes through the system, is focused on the last flat plane of the lens system, and returns to the left eye.

Although the Daniell's system cannot be used for widening a real angle of observation and merely redistributes and divides the optical path of light that passes through the system for stereo effect, this system is a good example of a two-array assembly for optical purposes. The use of a sandwich composed of two overlapped film-like or plate-like arrays makes it possible to significantly reduce the geometrical dimensions of the lens system, especially in the optical axis direction.

The applicants made an attempt to solve the problems of the prior-art technique by developing a flat wide-angle objective having reduced longitudinal dimensions as compared to known objectives with the same characteristics. This objective, which is described in U.S. patent application Ser. No. 10/862,178 filed by the same applicants on Jun. 7, 2004, is intended for creating images with extremely wide angle of observation. The objective consists of the first sub-unit, which is located on the object side of the objective, intended for reduction of the field angle of light incidence onto the objective, and comprises an assembly of at least two microlens arrays with the same pitch between the adjacent microlenses and arranged with respect to each other so as to provide afocality, and second sub-unit that is located on the image-receiving side of the objective and comprises an assembly of conventional spherical or aspherical microlenses that create an image on an image receiver. Each pair of coaxial microlenses of the microlens arrays of the first sub-unit form an inverted microtelescope of Galileo. The outlet aperture of a single microtelescope is made so that spherical aberration can be minimized almost to 0, while field aberrations can be corrected by design parameters of the microlenses. The use of such an array of microtelescopes makes it possible to significantly reduce the overall dimensions of the first sub-unit of the lens system since the longitudinal dimension of a unit telescopic cell of the array is much smaller than the longitudinal dimension of a conventional lens component used for the same function.

Although the aforementioned objective of U.S. patent application Ser. No. 10/862,178 significantly reduces the overall dimensions of the first sub-unit of the objective by replacing it with a set of thin-film microlenses, the second sub-unit that consists of conventional optical lenses still comprises a set of four conventional lenses. In principle, the objective described in U.S. patent application Ser. No. 10/862,178 can be realized with the use of only two or three conventional lenses but this could be done at the expense of the image quality that will be impaired because of aberration that could not be completely eliminated. These four lenses form a main factor that determines the overall longitudinal dimension of the objective, which still remains significant. Therefore, there is still enough room for improvement in this direction.

OBJECTS AND SUMMARY OF THE INVENTION

It is an object of the invention to further reduce overall dimensions of a flat wide-angle lens objective composed of a set of microlens arrays with a set of only two traditional lenses. It is another object to provide the aforementioned flat wide-angle lens objective that provides the same image quality as the known objective of this type with four traditional optical lenses. A further object is to provide a substatially flat objective that can be matched with CMOS, CCD, etc., and that can be integrated in an image-sensor camera module.

A flat wide-angle lens system of the invention is intended for creating images with extremely wide angle of observation. The wide-angle lens system consists of two main sub-units, i.e., a first sub-unit that is located on the object side of the objective that comprises an assembly of two conventional negative aspheric lenses, e.g., negative aspheric lenses having their flat sides facing the object, and a second sub-unit, i.e., a set of four microlens arrays arranged on the image-receiving side of the objective and having the same pitch between the adjacent microlenses. More specifically, the set of microlenses comprises a pair of identical microlens arrays, the first micro lens array and the second microlens array, interposed one onto the other with a diaphragm array sandwiched between the aforementioned first and second microlens arrays. The diaphragm array comprises a light-impermeable matrix with micro-openings of a predetermined diameter and with the same pitch as the aforementioned first and second microlens arrays. The diaphragm array may be made replaceable or may be applied as a permanent mask onto one of the aforementioned microlens arrays. The aforementioned set of microlens arrays further comprises a pair of additional identical microlens arrays, i.e., a third microlens array and a fourth microlens arrays. The third and fourth microlens arrays are located on opposite sides of the aforementioned sandwich and are equally spaced from the first and second microlens arrays, respectively. The objective described above may have an angle field ($2\omega$) equal to about 60°. The objective of the invention can be realized into an optimal practical design only with predetermined relationships between the parameters of the optical system that forms the objective. The invention makes it possible to significantly reduce longitudinal dimension of the objective.

In operation, the first sub-unit, i.e., the plano-concave lenses, creates an imaginary image of the object in the focal plane of the first sub-unit which is located on object side OB of the objective 20, while the second sub-unit, i.e., the set of four microlens arrays arranged on the image-receiving side of the objective, creates an actual image of the object in the image plane on the image-receiving side of the objective. In this case, the aforementioned focal plane of the first sub-unit that contains the imaginary image of the real object functions as the object plane for the second sub-unit. This imaginary image is transformed into an image of a real object in the aforementioned image plane of the objective by the second sub-unit. In transition of the image from the first sub-unit to the second sub-unit, the openings of the diaphragm array limit dimensions of images created by the unit microlens cells. In other words, the second sub-unit forms an image of the real object in the aforementioned image plane of the objective.

DETAILED DESCRIPTION OF THE INVENTION

Figure 1:
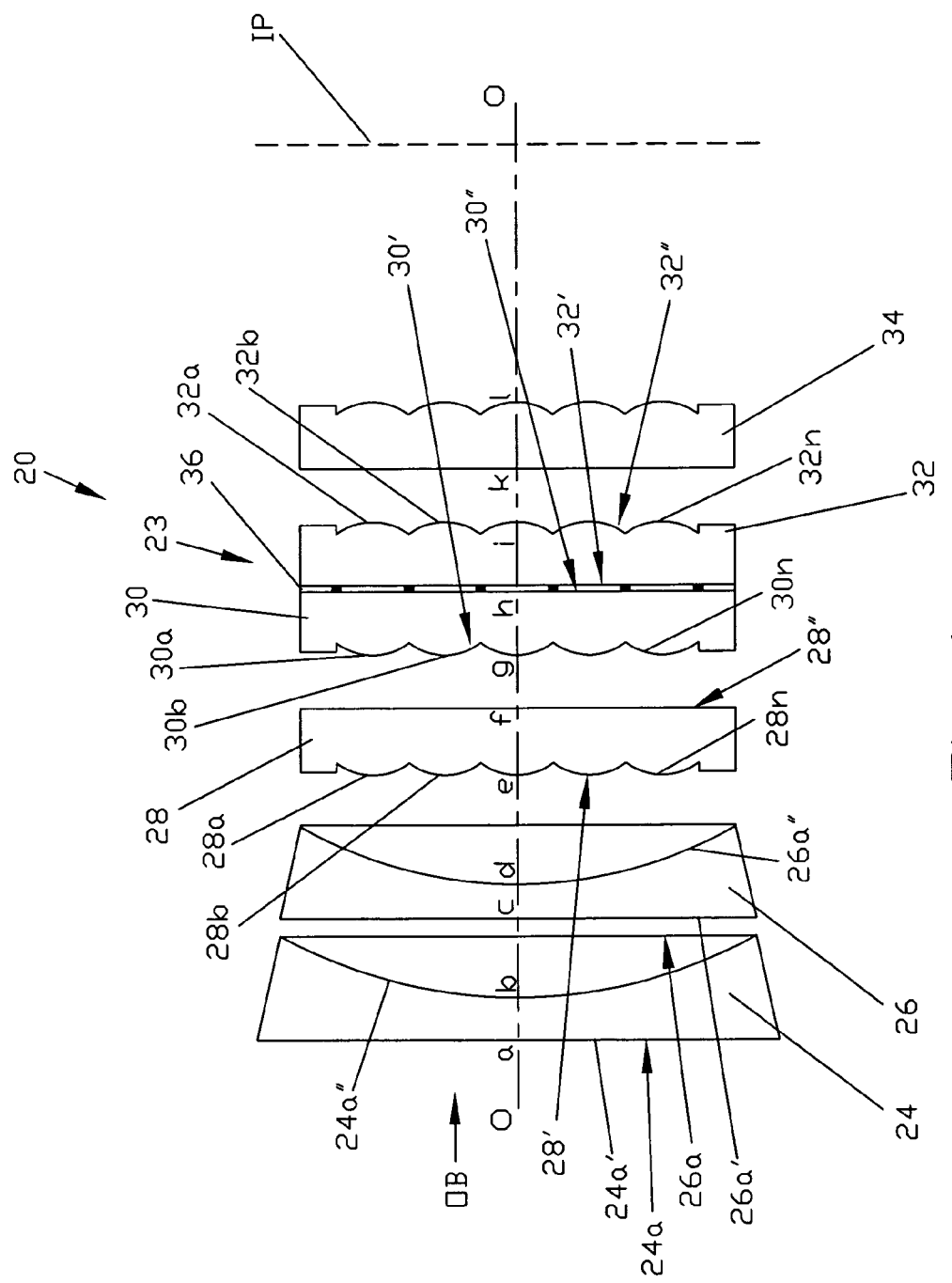
FIG. 1 is an explanatory longitudinal sectional view of a wide-angle lens system made in accordance with the invention.

A flat wide-angle lens system of the invention, which herein after will be referred to as an objective of the present invention, is shown in FIG. 1 which is a general longitudinal sectional view of the aforementioned objective. The objective of the invention as a whole is designated by reference numeral 20. The objective 20 consists of two sub-assemblies. The first sub-assembly 22 that is located on the object side OB, which is on the left side in the view of FIG. 1, comprises an assembly of two conventional negative aspheric lenses 24 and 26, having their flat sides 24a and 26a, respectively, facing the object side OB. The second sub-assembly 23 is a set of four microlens arrays 28, 30, 32, and 34 arranged on the image-receiving side IP, which is on the right side of the view of FIG. 1. Reference numeral 36 designates a diaphragm array, which will be described later in consideration of the second sub-assembly 23.

Now the aforementioned sub-assemblies 22 and 23 of the objective 20 of the invention will be described separately in more detail.

As has been mentioned above, the sub-assembly 22 that is located on the object side of the objective 20 consists of two plano-concave lenses 24a and 26a. The lens 24a has a flat side 24a' that faces the object side OB and a concave side 24a" that faces the image-receiving side IP. Similarly, the lens 24a has a flat side 26a' that faces the object side OB and a concave side 26a" that faces the image-receiving side IP.

In order to describe the geometry and dimensions of the objective components and their relationships, it would be advantageous to designate and show the point of intersection of the optical axis O—O with planes of the objective components sequentially in the direction from the object side to the image-receiving side IP. More specifically, these points of intersection are shown in FIG. 1 as points "a" through "I" and correspond to intersections of the optical axis O—O with the following components of the objective 20: "a"—on the flat surface 24a', "b"—on the concave surface 24a", "c"—on the flat surface 26a', "d"—on the concave surface 26", etc. It is understood that the dimensions of the lenses 24 and 26 and their relative positions will depend on distances between the points "a" through "d" as well as on the curvatures of the concave surfaces 24a" and 26a". These dimensions and curvatures will be given later in Table 1 after description of the second sub-assembly 23 with points of intersection "e" through "I" with the optical axis O—O.

The second sub-assembly comprises a set of four microlens arrays consisting of micro lens arrays 28, 30, 32, and 34 (FIG. 1), wherein the microlens arrays 30 and 32 are identical and interposed back to back one onto the other. There is a diaphragm array 36 sandwiched between the aforementioned microlens arrays 30 and 32. The aforementioned set 23 of microlens arrays further comprises a pair of additional identical microlens arrays 30 and 34, which are located on opposite sides of the aforementioned sandwich and are equally spaced from the microlens arrays 30 and 32, respectively.

Each microlens array consists of a plurality of microlenses. More specifically, the microlens array 28 has a plurality of microlenses 28a, 28b, . . . 28n on the side OB that faces the object. The microlens array surface 28' of the microlens array 28 intersects the optical axis O—O in point "e". The side 28" of the microlens array 28 opposite to the microlens array surface 28" is flat and intersects the optical axis O—O in point "f". The surface 30' of the microlens array 30 that faces the object side OB has a plurality of microlenses 30a, 30b, . . . 30n and is spaced from the microlens array 28 at a distance given below in Table 1. The surface 30' intersects the optical axis O—O in point "g". The surface 30" of the microlens array 30 that faces the image-receiving side IP is flat and intersects the optical axis O—O in point "h". The side 32" of the microlens array 32 is flat and is interposed onto the flat surface 30" of the microlens array 30. The side 32" intersects the optical axis O—O in a point (not shown) close to point "h" and spaced therefrom by a distance that is equal to the thickness of the diaphragm array 36. Since the diaphragm array 36 may have a thickness from several to several tenth of a micron and may be applied as a mask onto one of the mating flat surfaces, the aforementioned distance between the sides 30" and 32" can be ignored, and it can be assumed that both interposed flat surfaces intersect the optical axis in the same point "h".

The microlens array 34 has the microlens array surface 34' that faces the object side OB of the objective 20 that intersects the optical axis O—O in point "k". The surface 34' has a plurality of microlenses 34a, 34b, . . . 34n. The side 34" that faces the image-receiving side IP of the objective 20 intersects the optical axis O—O in point "I". The microlens array 34 is spaced from the microlens array 32 at a distance indicated below in Table 1.

It is important to note that all microlens arrays 28 through 34 have their microlenses arranged with the same pitch P and have the same flat-lattice arrangement in all the lenses. In other words, the microlenses 28a, 28b, . . . 28n have the same pitch and arrangement as the microlenses 30a, 30b, . . . 30n, the microlenses 32a, 32b, . . . 32n, and the microlenses 34a, 34b, . . . 34n. However, as will be seen from Table 1 given below, the microlenses 30a, 30b, . . . 30n and 32a, 32b, . . . 32n of identical microlens arrays 30 and 32 have microlens curvatures different from those of the microlenses 28a, 28b, . . . 28n, and 34a,34b . . . 34n of the identical microlens arrays 28 and 34.

Figure 2:
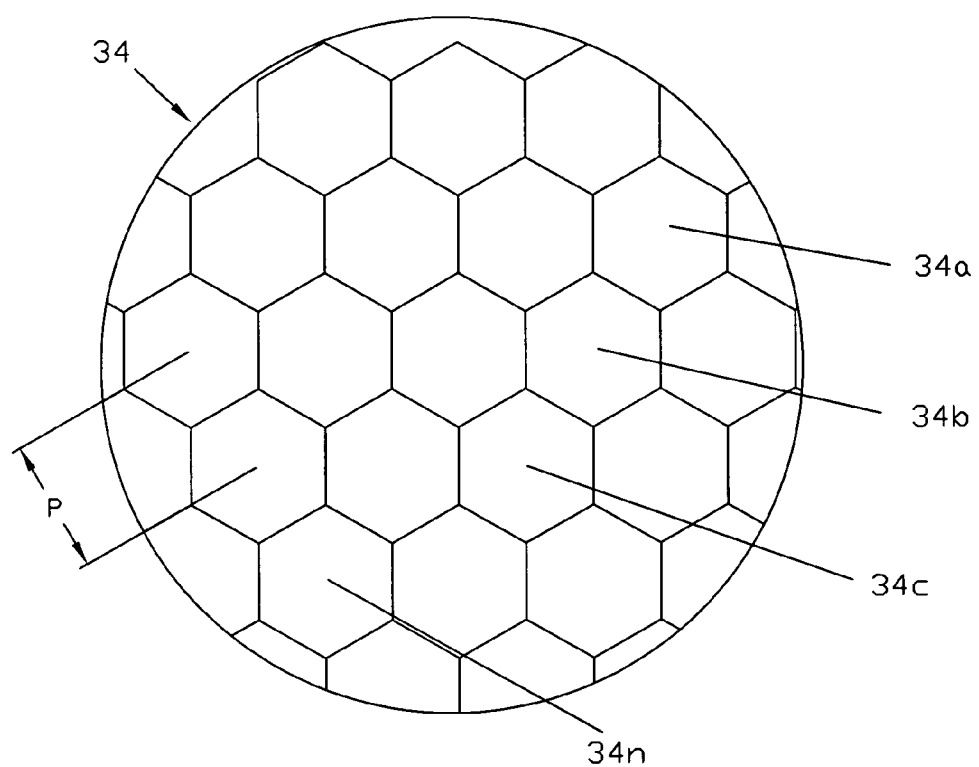
FIG. 2 is a view in the direction from the image-receiving side of the objective that shows hexagonal-lattice arrangement of microlenses packing.
Figure 3:
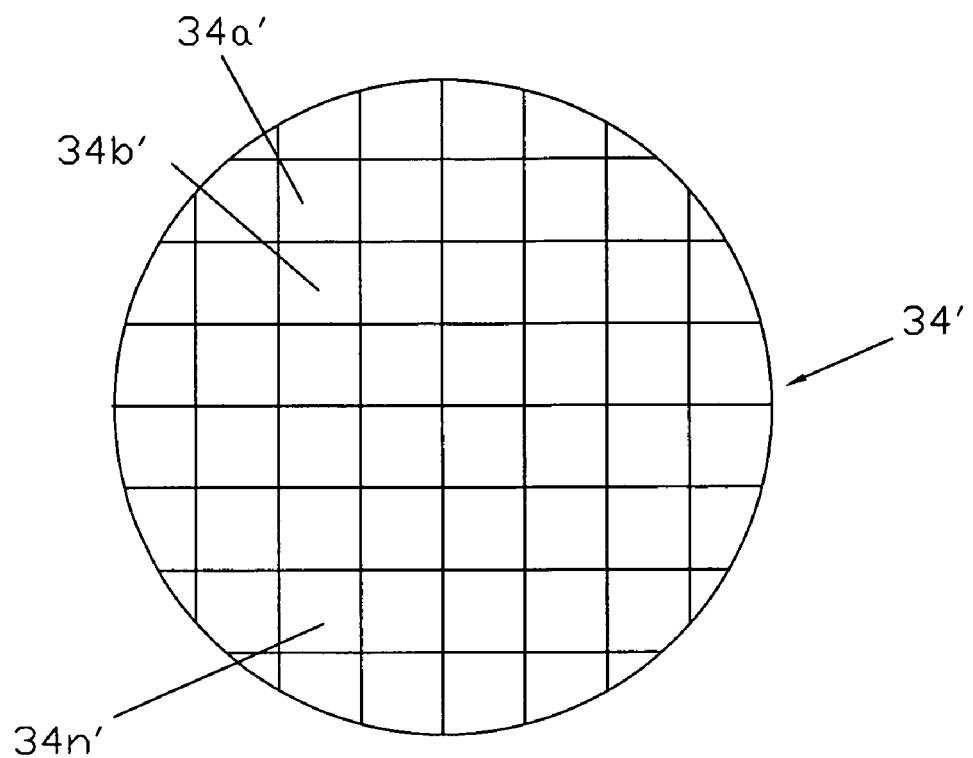
FIG. 3 is a view similar to in FIG. 2 that shows orthogonal-lattice arrangement of microlenses packing.

The arrangement of microlenses, e.g., of microlenses 34a, 34b, . . . 34n, when viewed in the direction of an optical axis from the image-receiving side IP towards the object side OB, is shown in FIG. 2 and FIG. 3, where FIG. 2 illustrates a hexagonal-lattice arrangement, and FIG. 3 illustrates an orthogonal arrangement. In FIG. 3, the microlenses are designated as 34a', 34b', . . . 34n'.

Figure 4:
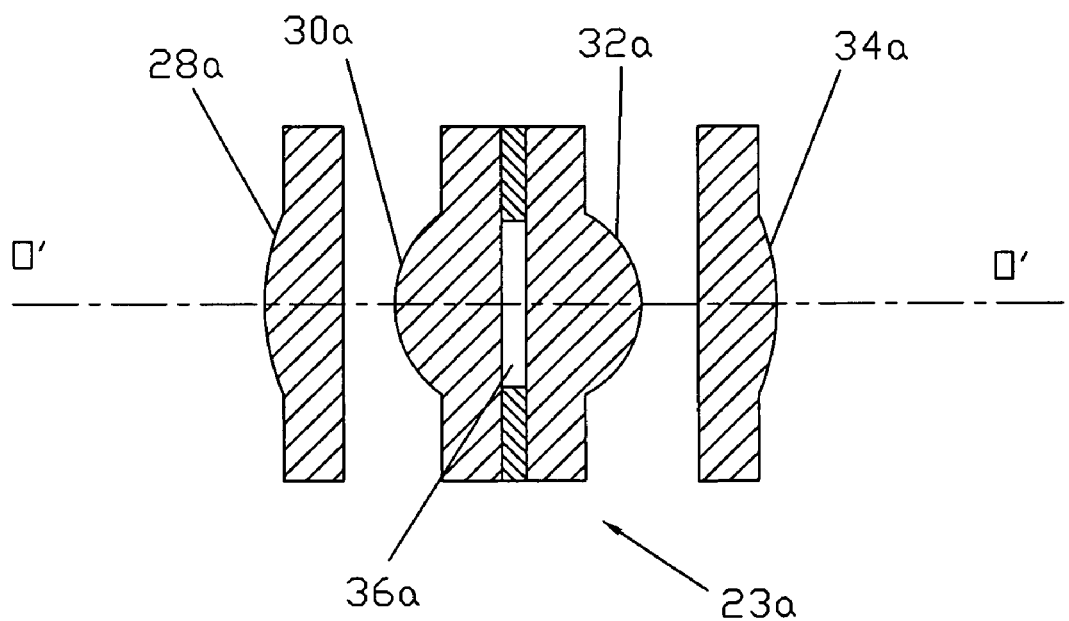
FIG. 4 is a longitudinal sectional view of a unit microlens cell.

In all the microlens arrays 28 to 34 the microlenses are coaxial. In other words, the microlenses 28a, 30a, 32a, and 34a are coaxial and are arranged on the same axis O'—O' that is parallel to the optical axis O—O. The same relates to the microlenses 28b, 30b, 32b, and 32b . . . 28n, 30n, 32n, 34n. This is shown in FIG. 4, which illustrates a sequence of the coaxial microlenses of the sub-assembly 23. The sequence of the type shown in FIG. 4 forms a so-called unit microlens cell 23a for propagating a beam of light in the direction from said object to said image plane.

Figure 5:
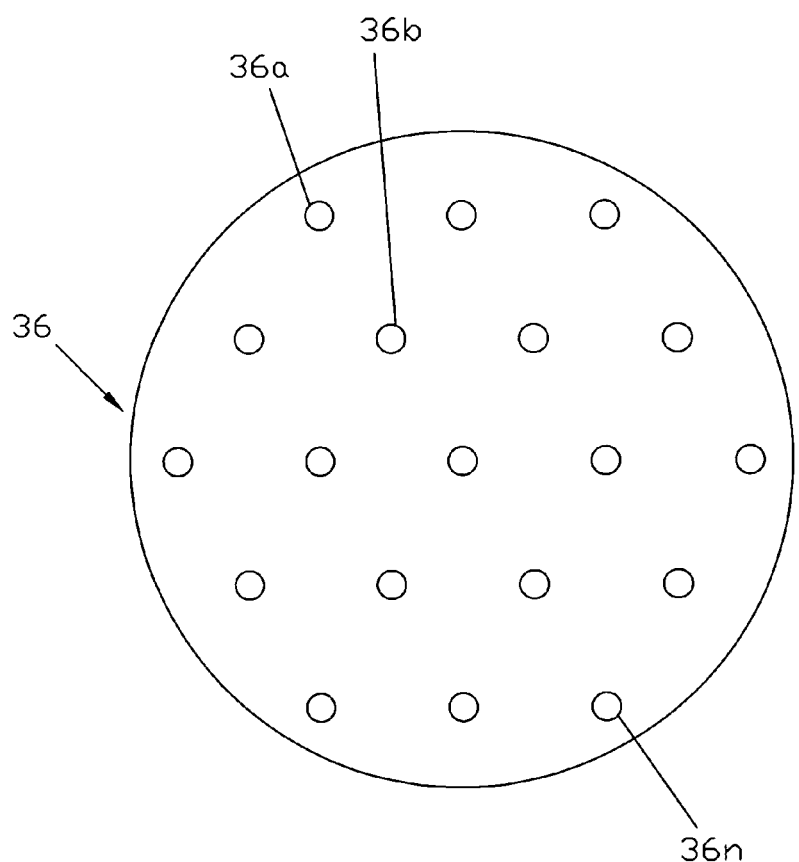
FIG. 5 is a front view of a diaphragm array that shows arrangement of diaphragm openings.

FIG. 5 is a front view of the aforementioned diaphragm array 36. It can be seen that the diaphragm 36 has a plurality of micro openings 36a, 36b, . . . 36n which have the same arrangement and pitch P as the respective microlenses 28a, 28b, . . . 28n, 30a, 30b, . . . 30n, 32a, 32b, . . . 32n, and 34a, 34b, . . . 34n. The microopenings 36a, 36b, . . . 36n are coaxial to the aforementioned respective microlenses. The diameters of the microopenings 36a, 36b, . . . 36n of the diaphragm 36 should be smaller than the diameter of a circle inscribed into the hexagonal or square contours of the microlenses shown in the arrangements of FIGS. 2 and 3.

The distances between all the components of the wide-angle objective 20 of the present invention and curvatures of the lenses and microlenses are shown in Table 1 with reference to the aforementioned points of intersections. It is understood that the dimensions of the objective given in Table 1 relate only to one specific example of the objective and do not limit the scope of application of the invention.

TABLE 1

| Point of intersection (1) | Radii (mm) (2) | Thickness (mm) (3) | Clear Aperture (mm) (4) | Refractive Index (5) | Dispersion (6) |
| --- | --- | --- | --- | --- | --- |
| a | 0.0000 | 0.500 | 4.00 | 1.77 | 49.6 |
| b | 0.3860* | 0.500 | 3.40 | | |
| c | 0.0000 | 0.300 | 3.30 | 1.77 | 49.6 |
| d | 0.4984* | 0.720 | 3.20 | | |
| e | 0.5800r | 0.500 | 3.30 | 1.77 | 49.6 |
| f | 0.0000 | 0.220 | 3.30 | | |
| g | 0.3900r | 0.500 | 3.30 | 1.77 | 49.6 |
| h | 0.0000 | 0.004 | 3.30 | | |
|   | 0.0000 | 0.500 | 3.30 | 1.77 | 49.6 |
| i | −0.3900r | 0.220 | 3.30 | | |
| k | 0.0000 | 0.500 | 3.30 | 1.77 | 49.6 |
| l | −0.5800r |  | 3.30 | | |

The radii (mm) in column (2) of Table 1 designate radii of curvature on surfaces intersecting with respective points "a" through "I". Since the curved surfaces $24a''$ and $26a''$ with points of intersection 'b' and "d" are aspherical, the curvatures indicated in column (2) correspond to spherical components of these surfaces. Sign "*" designates asphericity of the surfaces $24a''$ and $26a''$ with constants K of asphericity being equal to K=−1 (parabolic) for both surfaces $24a''$ and $26a''$. Symbol "r" designates microlens array. The thickness in column (3) corresponds to the thickness between the adjacent surfaces. For example, thickness 0.500 mm in the line "a" corresponds to the thickness of the lens 24 between the points "a" and "b". Thickness 0.300 mm in the line "c" corresponds to the distance between points "c" and "d", etc. Clear aperture in column (4) of the table is the so-called light aperture that approximately coincides with the diameter of the lens in the conventional lens and diameter of the entire microlens array in the case of the microlens array. For example, clear aperture 4.00 mm in column (4) of line "a" designates the maximal diameter of the lens 24 on the surface $24a'$. Clear aperture 3.30 mm in column (4) of line "e" designates a diameter of the microlens array 32, etc. All optical elements of the objective have the same refractive index, which for the specific material and the dimensions of the lenses illustrated here as an example is equal to 1.7. The same relates to dispersion that in the illustrated example is equal to 49.6. The data of Table 1 corresponds to the hexagonal-lattice arrangement of the microlenses with microlens pitch P=400 $\mu$m.

It should be noted that with specifically selected parameters, an example of which for a specific case is shown in Table 1, each microlens array contains no more than a certain amount of microlenses. For example, in the case of the parameters of Table 1 the number of microlenses is about 100. It is important, in this connection, to understand that the objective 20 of the invention creates a real image of the object which is not a discrete pixel-type image but a continuous image which in no way is associated with the number of microlenses in the microlens arrays 28, 30, 32, and 34. This means that the dimensions of the second sub-unit 42 have no design limitations in the transverse direction, and that the transverse dimension of the objective is limited only by the dimensions of the lenses in the sub-unit 40. In other words, the objective of the invention can be matched with a CCD or CMOS having any number of pixels.

Figure 6:
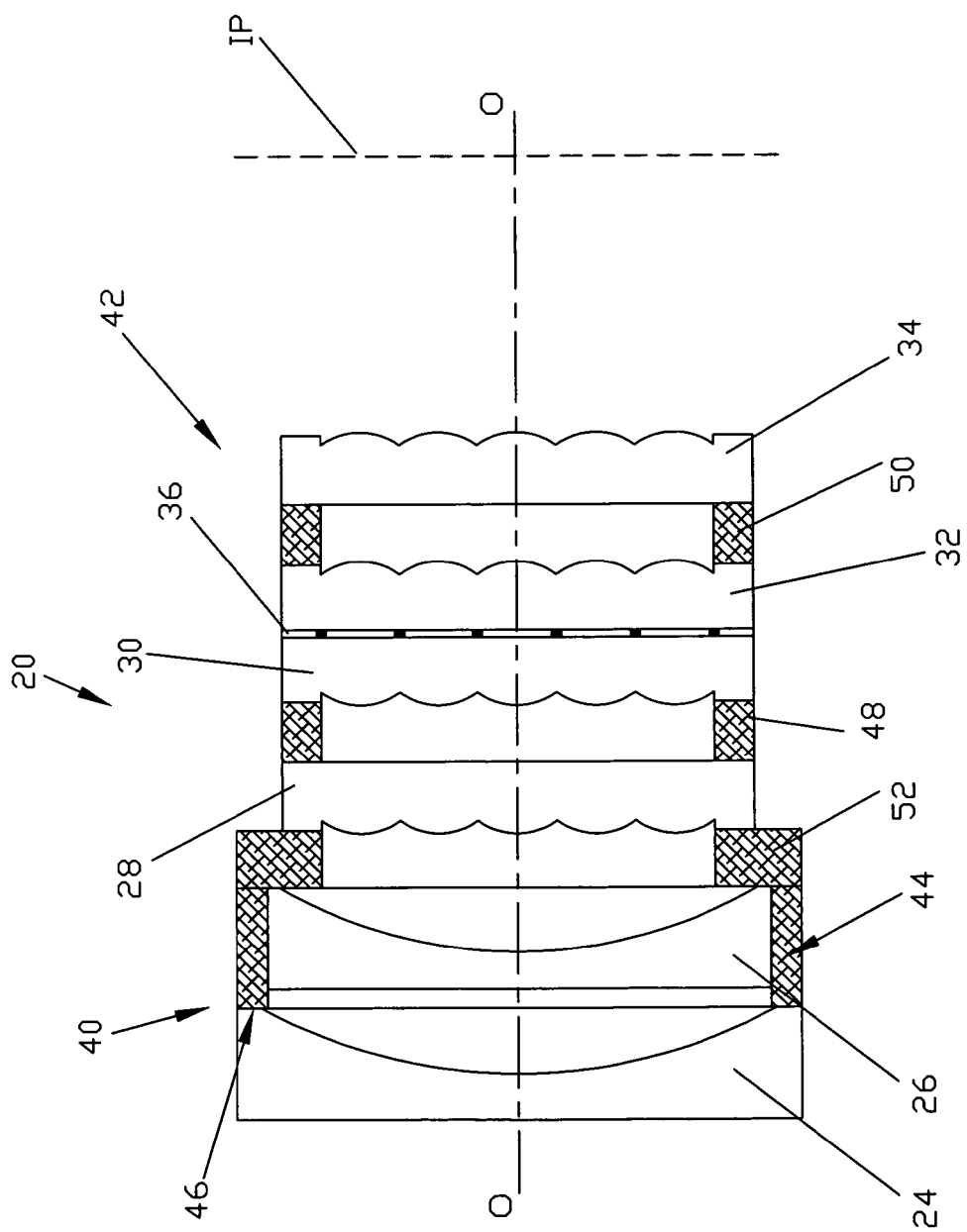
FIG. 6 is a longitudinal sectional view of the objective of FIG. 1 in an assembled state.

FIG. 6 is a longitudinal sectional view of the objective 20 of FIG. 1 in an assembled state. The objective 20 shown in FIG. 6 is assembled from two pre-assembled sub-units 40 and 42. The sub-unit 40 consists of the plano-concave lens 24 and the plano-concave lens 26, of which the plano-concave lens 26 is inserted into a thick cylindrical rim 44. The lens 24 is attached, e.g., glued, to the end face of the cylindrical rim 44. The lenses 24 and 26 have a relative position that correspond to distances indicated in Table 1. The second sub-unit 42 is composed of four microlens arrays 28, 30, 32, and 34. The microlens arrays 30 and 32 are connected to each other, e.g., glued to each other, via the diaphragm array 36 sandwiched between the microlens arrays 30 and 32, while two lateral microlens arrays 28 and 34 are connected to the end faces of the microlens arrays 30 and 32 by gluing via spacers 48 and 50, respectively. The spacers of the aforementioned pre-assembled sub-units 40 and 42 are interconnected, e.g., by gluing, e.g., via a spacer 52. The widths of the spacers 48, 50, and 52 are selected so that the distances between respective points "a" through "I" (FIG. 1) correspond to those indicated in Table 1.

Figure 7:
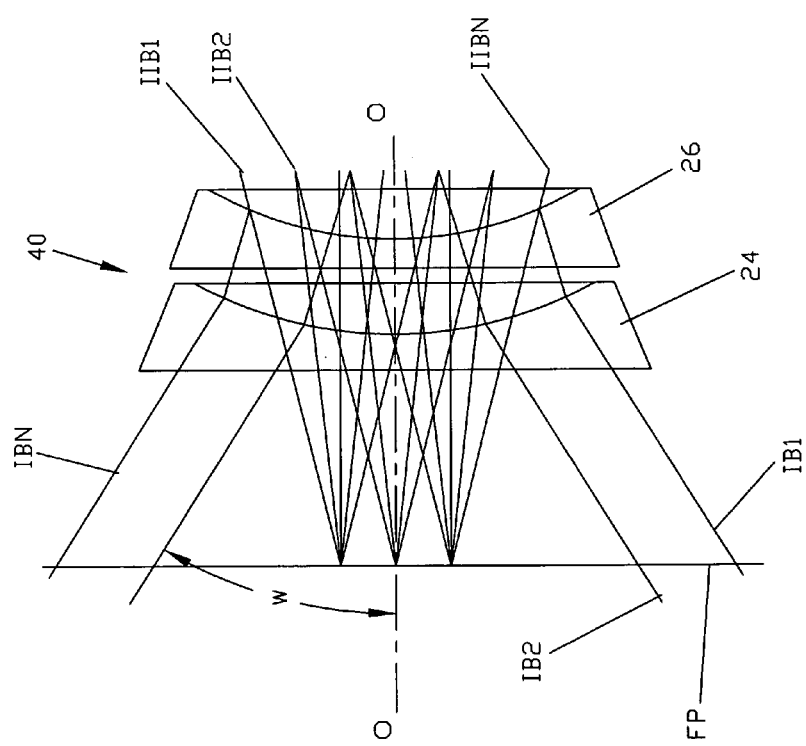
FIG. 7 is a view illustrating optical ray traces for the light beams passing through the sub-unit of two plano-concave lenses included in the objective of the invention.

FIG. 7 is a view illustrating optical ray traces for the light beams passing through the sub-unit 40 of two plano-concave lenses 24 and 26 included in the objective 20 of the invention. Reference numerals IB1, IB2 . . . IBn designate input rays that enter the objective 20 from the objective side OB. The plano-concave lenses 24 and 26 create an imaginary image of the object in their focal plane FP. It is understood that the aforementioned image is located on the object side OB of the objective 20.

Figure 8:
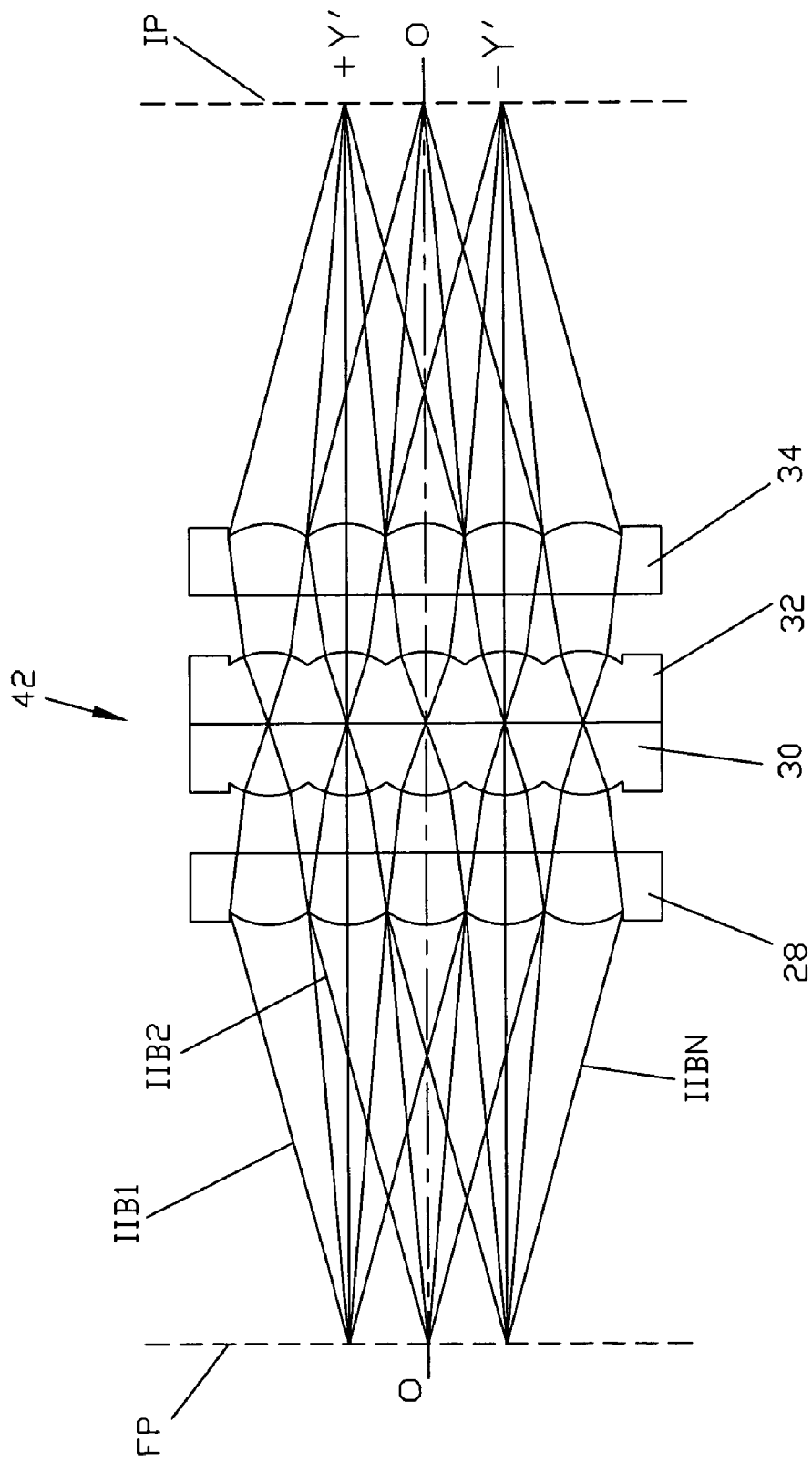
FIG. 8 is a view illustrating optical ray traces for the light beams passing through the sub-unit of four microlens arrays included in the objective of the invention.

FIG. 8 is a view illustrating optical ray traces for the light beams IIB1, IIB2 . . . IIBn passing through the sub-unit 42 of four microlens arrays 28, 30, 32, and 34 included in the objective 20 of the invention. The sub-unit 42 creates an actual image of the object 20 in the image plane IP (FIG. 1 and FIG. 8) on the image-receiving side of the objective 20. However, in this case, a function of the object plane is fulfilled by the aforementioned focal plane of the sub-unit 40 that contains the imaginary image of the real object. In other words, the sub-unit 42 of four microlens arrays 28, 30, 32, and 34 forms an image of the real object in the aforementioned image plane IP of the objective 20 with an image-transfer ratio of 1:1. This is achieved due to appropriate selection of parameters for components of the second sub-unit an example of which is shown in Table 1.

Figure 9:
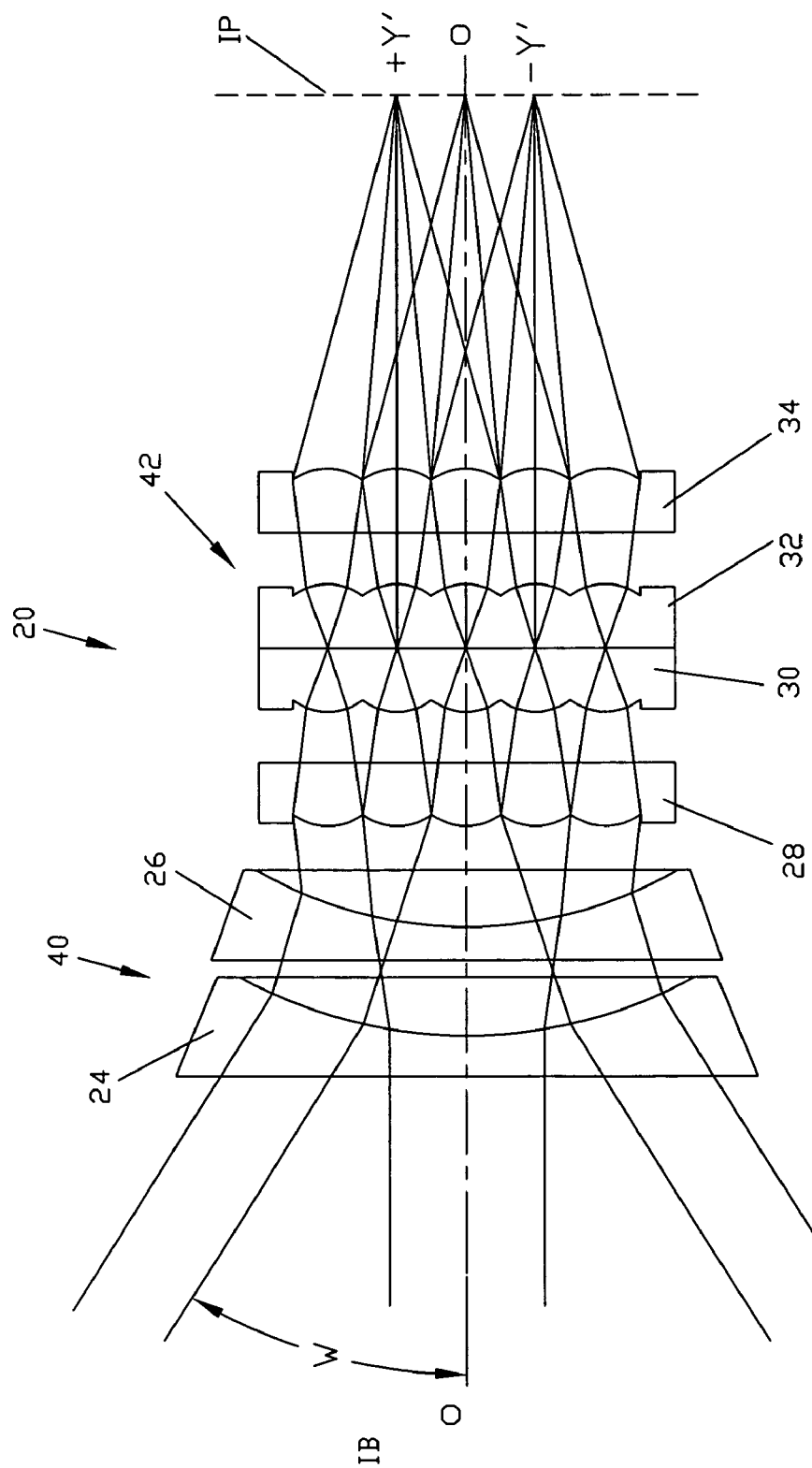
FIG. 9 is a view illustrating optical ray traces for the light beams passing from the input side to the output side of the objective of the invention as a whole.

FIG. 9 is a view illustrating optical ray traces for the light beams passing from the input side IB to the output side IP of the objective 20 of the invention as a whole. In connection with the operation of the entire objective 20, it is important to note that in transition of the image from the sub-unit 40 to the sub-unit 42, the openings $36a$, $36b$, . . . $36n$ of the diaphragm array 36 limit dimensions of images created by the unit microlens cells, such as the one designated by reference numeral $23a$ in FIG. 4.

Thus, it has been shown that the invention provides a flat wide-angle objective with reduced dimensions and with the use of only two traditional lenses combined with a set of microlens arrays. The flat objective of the invention can be matched with CMOS, CCD, etc., and can be integrated in an image-sensor camera module.

Although the flat wide-angle lens system of invention has been described in detail with reference to specific embodiments and drawings, it is understood that these embodiments do not limit the field of application of the invention and that any changes and modifications are possible, provided they do not go beyond the scope of the patent claims. For example, the number of lenses in the second component may be different from those describe and shown in this specification. The dimensions, pitch, sag, and other characteristics of microlenses in microlens assemblies can vary in a wide range. The microlenses and lenses of the second component may be coated with anti-reflective coatings. The lens system or objective of the present invention may be designed and calculate for use with lights in invisible wavelength ranges, e.g., in the UV and IR ranges. In the UV case, the lens arrays and conventional lenses can be made from UV-grade quartz and special glasses, magnesium fluoride, potassium fluoride, etc. In the case of IR, the lens arrays and conventional lenses can be made from material with high refractive indices, e.g., from germanium, etc. The numbers given in Table 1 relates to a specific example described in the present application. It is understood that similar objectives can be made from materials other than those mentioned and with different geometrical dimensions without departure from the scope of the claims of the present invention. In that case, other numbers will be contained in a table similar to Table 1. The microlens arrays 30 and 32 can be formed as a single piece without the diaphragm array. The wide-angle objective of the invention can be easily matched with CCD's or CMOS image sensors with the diagonal dimensions of about 3.2 mm.

What we claim is:

1. A flat wide-angle objective for creating a real image of an object, said flat wide-angle objective having an object side and an image-receiving side and comprising:
   a first sub-unit located on said object side, said first sub-unit having a focal plane on said object side and comprising at least two negative aspheric lenses that create an imaginary image of said object in said focal plane; and
   a second sub-unit located on said image-receiving side having an image plane of said flat wide-angle objective on said image-receiving side and comprising a set of microlens arrays; said second-sub-unit having an object plane that coincides with said focal plane of said first-sub-unit so that said second sub-unit forms said real image of said object in said image plane of said flat wide-angle objective.

2. The flat wide-angle objective of claim 1, wherein said two negative aspheric lenses comprises a first negative aspheric lens and a second negative aspheric lens, both having flat surfaces that face said object side and concave surfaces that face said image-receiving side, said first negative aspheric lens and said second negative aspheric lens having interrelated dimensions, relative positions and curvatures selected so as to provide formation of said imaginary image in said focal plane.

3. The flat wide-angle objective of claim 2, wherein said second sub-unit comprises a set of at least four microlens arrays consisting of a first microlens array, a second microlens arrays, a third microlens arrays, and a fourth microlens array, each said microlens array having a plurality of microlenses having the same pitch between said microlenses and the same arrangement of said microlenses in each of said microlens arrays, said second microlens array and said third microlens array having said microlenses thereof facing in mutually opposite directions with said microlenses of said second microlens arrays facing said object side and said with said microlenses of said third microlens array facing said image-receiving side; said first microlens arrays and said fourth microlens array being identical and having a symmetrical arrangement with respect to said second micro lens array and said third microlens array; said microlenses of said first microlens array and said fourth microlens array having their curvatures different from curvatures of said microlenses of said second microlens array and said third microlens array.

4. The flat wide-angle objective of claim 3, wherein said first microlens array, said second microlens array, said third microlens array, and said fourth microlens array have interrelated dimensions, relative positions, and curvatures of microlenses thereof selected so as to provide formation of said real image of said object in said image plane.

5. The flat wide-angle objective of claim 3, wherein said microlenses have an arrangement selected from a hexagonal-lattice arrangement and a square-lattice arrangement with hexagonal or square shapes of said microlenses.

6. The flat wide-angle objective of claim 5, wherein each group of microlenses which are aligned and are located in said first microlens arrays, said second microlens array, said third microlens array, and said fourth microlens array forms a unit microlens cell for propagating a beam of light in the direction from said object to said image plane.

7. The flat wide-angle objective of claim 5, wherein said first microlens array, said second microlens array, said third microlens array, and said fourth microlens array have interrelated dimensions, relative positions, and curvatures of microlenses thereof selected so as to provide formation of said real image of said object in said image plane.

8. The flat wide-angle objective of claim 5, further comprising a diaphragm array sandwiched between said second microlens array and said third microlens array, said diaphragm array having openings arranged with the same pitch and with the same arrangement as said microlenses.

9. The flat wide-angle objective of claim 8, wherein said openings of said diaphragm array have a diameter equal to or smaller than a diameter of a circle inscribed into said microlenses of said second microlens array and said third microlens array.

10. The flat wide-angle objective of claim 8, wherein each group of microlenses which are aligned and are located in said first microlens arrays, said second microlens array, a respective opening of said diaphragm array, said third microlens array, and said fourth microlens array form a unit microlens cell for propagating a beam of light in the direction from said object to said image plane.

11. A flat wide-angle objective for creating a real image of an object, said flat wide-angle objective having an object side and an image-receiving side and comprising:
    a first sub-unit located on said object side, said first sub-unit having a focal plane on said object side and comprising two plano-concave aspheric lenses that create an imaginary image of said object in said focal plane; and
    a second sub-unit located on said image-receiving side having an image plane of said flat wide-angle objective on said image-receiving side and comprising a set of microlens arrays; said second-sub-unit having an object plane that coincides with said focal plane of said first-sub-unit so that said second sub-unit forms said real image of said object in said image plane of said flat wide-angle objective with an image-transfer ratio of 1:1.

12. The flat wide-angle objective of claim 11, wherein said two negative aspheric lenses comprises a first negative aspheric lens and a second negative aspheric lens, both having flat surfaces that face said object side and concave surfaces that face said image-receiving side, said first negative aspheric lens and said second negative aspheric lens having interrelated dimensions, relative positions and curvatures selected so as to provide formation of said imaginary image in said focal plane.

13. The flat wide-angle objective of claim 12, wherein said second sub-unit comprises a set of four microlens arrays consisting of a first microlens array, a second microlens arrays, a third microlens arrays, and a fourth microlens array, each said microlens array having a plurality of microlenses having the same pitch between said microlenses and the same arrangement of said microlenses in each of said microlens arrays, said second microlens array and said third microlens array having said microlenses thereof facing in mutually opposite directions with said microlenses of said second microlens arrays facing said object side and said with said microlenses of said third microlens array facing said image-receiving side; said first microlens arrays and said fourth microlens array being identical and having a symmetrical arrangement with respect to said second micro lens array and said third microlens array; said microlenses of said first microlens array and said fourth microlens array having their curvatures different from curvatures of said microlenses of said second microlens array and said third microlens array.

14. The flat wide-angle objective of claim 13, wherein said first microlens array, said second microlens array, said third microlens array, and said fourth microlens array have interrelated dimensions, relative positions, and curvatures of microlenses thereof selected so as to provide formation of said real image of said object in said image plane.

15. The flat wide-angle objective of claim 13, wherein said microlenses have an arrangement selected from a hexagonal-lattice arrangement and a square-lattice arrangement with hexagonal or square shapes of said microlenses.

16. The flat wide-angle objective of claim 15, wherein each group of microlenses which are aligned and are located in said first microlens arrays, said second microlens array, said third microlens array, and said fourth microlens array forms a unit microlens cell for propagating a beam of light in the direction from said object to said image plane.

17. The flat wide-angle objective of claim 15, wherein said first microlens array, said second microlens array, said third microlens array, and said fourth microlens array have interrelated dimensions, relative positions, and curvatures of microlenses thereof selected so as to provide formation of said real image of said object in said image plane.

18. The flat wide-angle objective of claim 15, further comprising a diaphragm array sandwiched between said second microlens array and said third microlens array, said diaphragm array having openings arranged with the same pitch and with the same arrangement as said microlenses.

19. The flat wide-angle objective of claim 18, wherein said openings of said diaphragm array have a diameter equal to or smaller than a diameter of a circle inscribed into said microlenses of said second microlens array and said third microlens array.

20. The flat wide-angle objective of claim 18, wherein each group of microlenses which are aligned and are located in said first microlens arrays, said second microlens array, a respective opening of said diaphragm array, said third microlens array, and said fourth microlens array form a unit microlens cell for propagating a beam of light in the direction from said object to said image plane.

* * * * *